Figure 1:
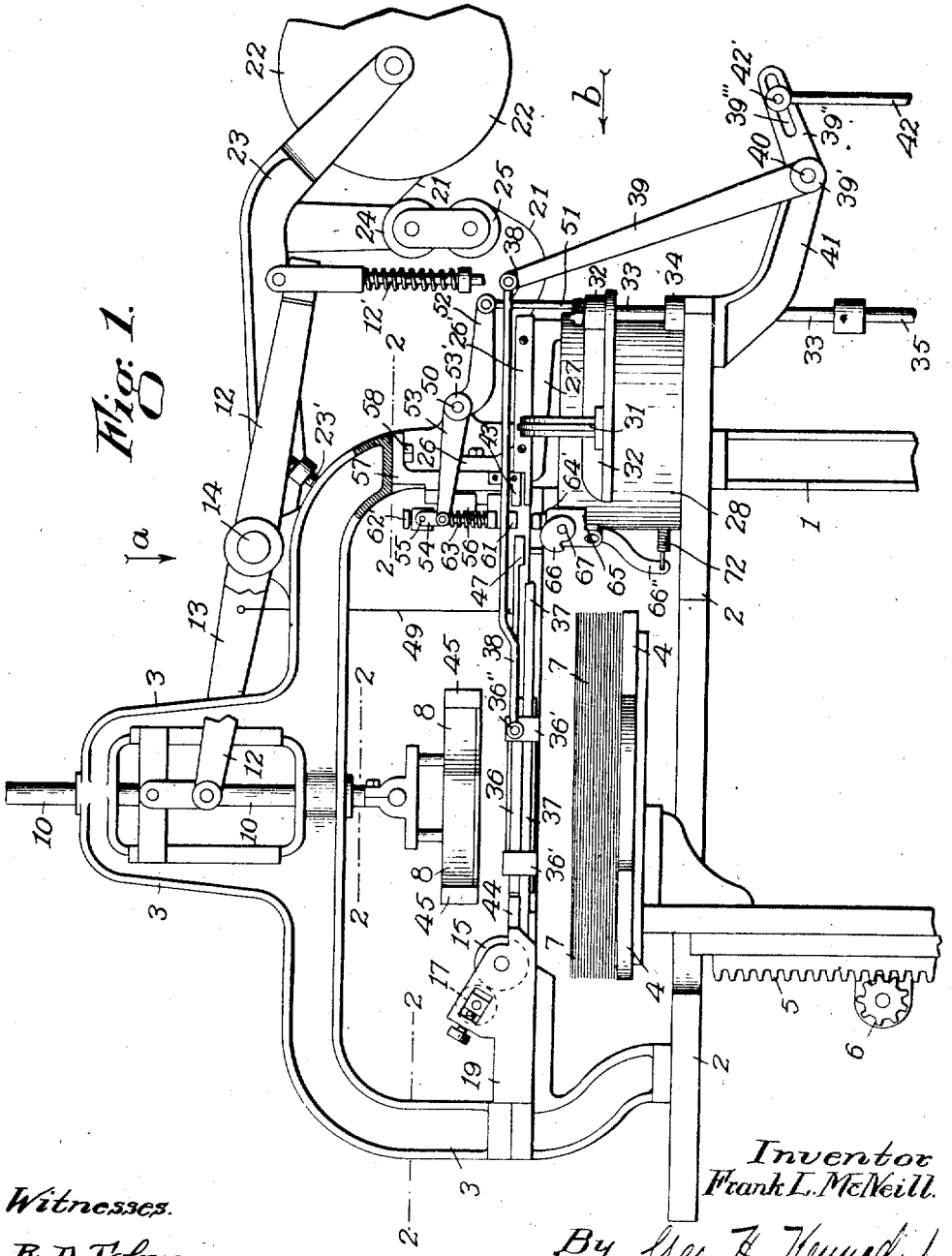

F. L. McNEILL.

ENVELOP MACHINE.

APPLICATION FILED JULY 26, 1915.

Reissued July 25, 1916.

14,172.

4 SHEETS—SHEET 1.

Witnesses.

R. D. Tolman.

Penelope Bomberbach.

Inventor

Frank L. McNeill.

By Geo. H. Kennedy Jr.

Attorney

F. L. McNEILL.

ENVELOP MACHINE.

APPLICATION FILED JULY 26, 1915.

Reissued July 25, 1916.

14,172.

4 SHEETS—SHEET 2.

Inventor
Frank L. McNeill.
By Geo. H. Kennedy Jr.
Attorney

Witnesses.
R. D. Tolman.
Penelope Weinberbach

F. L. McNEILL.

ENVELOP MACHINE.

APPLICATION FILED JULY 26, 1915.

Reissued July 25, 1916.

14,172.

4 SHEETS—SHEET 3.

Witnesses

R. D. Tolman.

Penelope Comberbach

Inventor

Frank L. McNeill.

By Geo. H. Kennedy Jr

Attorney

F. L. McNEILL.
ENVELOP MACHINE.
APPLICATION FILED JULY 26, 1915.
Reissued July 25, 1916.
14,172.
4 SHEETS—SHEET 4.
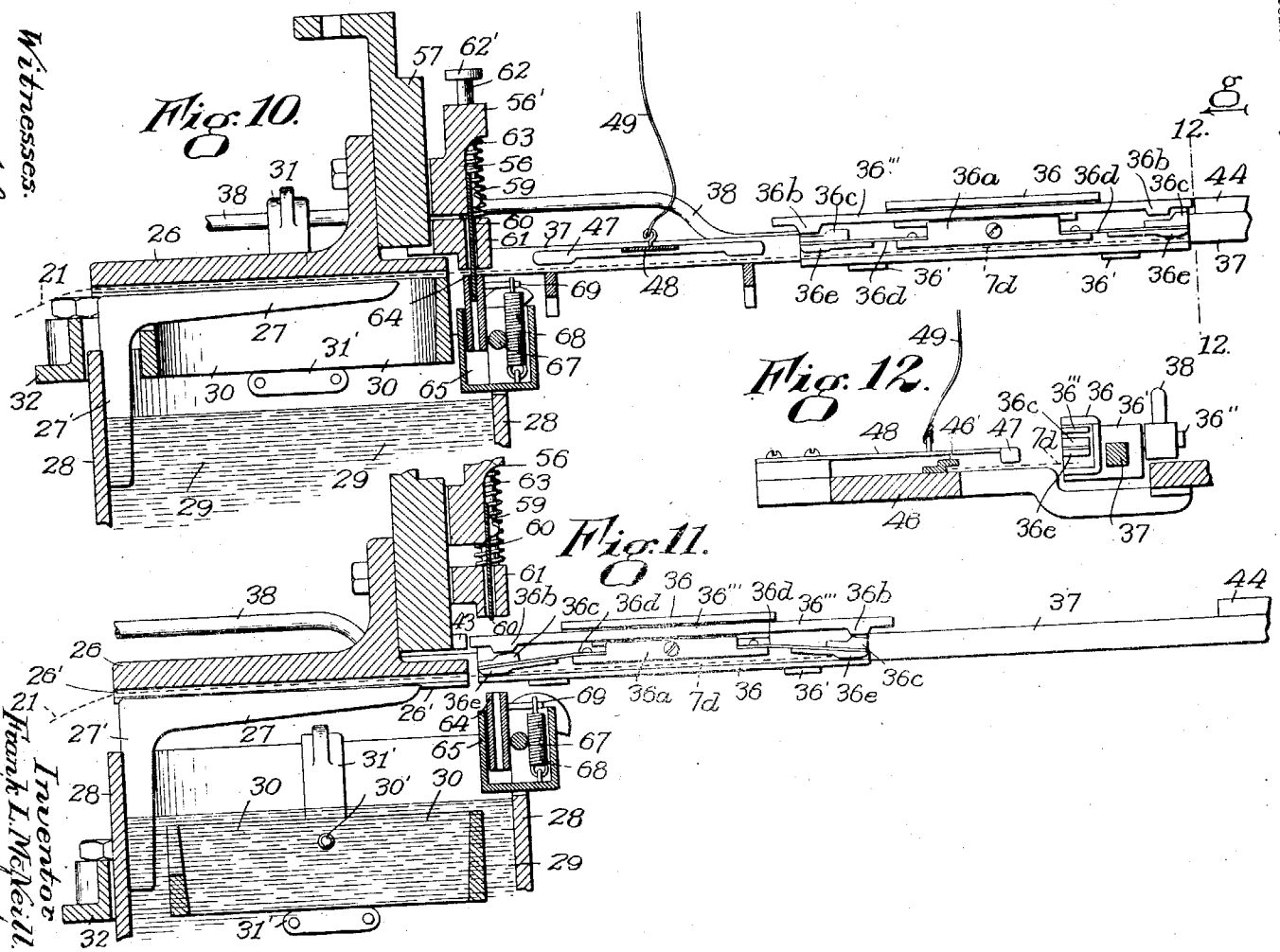
Witnesses.
R. D. Ibman.
Penelope Bomberbach.
Inventor
Frank L. McNeill.
By Geo. H. Kenneday Jr.
Attorney

UNITED STATES PATENT OFFICE.

FRANK L. McNEILL, OF WORCESTER, MASSACHUSETTS, ASSIGNOR, BY MESNE ASSIGNMENTS, TO UNITED STATES ENVELOPE COMPANY, OF SPRINGFIELD, MASSACHUSETTS, A CORPORATION OF MAINE.

ENVELOP-MACHINE.

14,172. Specification of Reissued Letters Patent. Reissued July 25, 1916.

Original No. 1,091,229, dated March 24, 1914, Serial No. 532,026. Application for reissue filed July 26, 1915. Serial No. 42,079.

*To all whom it may concern:*

Be it known that I, FRANK L. McNEILL, a citizen of the United States, residing at Worcester, in the county of Worcester and State of Massachusetts, have invented certain new and useful Improvements in Envelop-Machines, of which the following is a specification.

My invention relates to envelop machines, and more particularly to mechanism, preferably combined with an envelop machine, for making the type of envelop which is known to the trade as "outlook" envelops, which have an opaque body with an opening therethrough, and a transparent piece of paper on the inside of the envelop covering said opening, for the purpose of disclosing the address upon the inclosure in the envelop.

The object of my invention is to improve upon the mechanism for manufacturing envelops of the type referred to, which mechanism has heretofore been combined with machines of different kinds for making envelops.

It has been customary in all machines, or mechanisms for making envelops of the type referred to, which have heretofore been used, to apply gum or adhesive material to the envelop blank around the opening therein, preparatory to the attachment of the transparent patch or sheet of paper thereto.

In my improved construction, instead of applying gum or adhesive material to the envelop blank around the opening therein, as has always been customary heretofore, I apply the gum or adhesive material to the patch or sheet of transparent paper to be attached to the envelop blank, and after the gum or adhesive material is applied to the patch or transparent sheet of paper, said patch, which is preferably cut from a continuous strip, is carried over the opening in the envelop blank, and preferably carried down and pressed on the envelop blank, to secure it thereto, preferably substantially simultaneously with the gumming of the flaps of the envelop blank, and the raising of the envelop blank to be carried to the creasing and folding box.

My invention consists in certain novel features of construction of my improvements as will be hereinafter fully described.

I have shown in the drawings my improvements, which form a supplemental mechanism or attachment for an envelop machine, to make the type of envelop referred to, combined with an envelop machine of well known construction and operation, which outside of my improvements forms no part of my invention, but it will be understood that my improvements may be combined with any ordinary type of machine for manufacturing envelops, or may if desired be used separate from the envelop machine.

I have shown in the drawings a continuous strip of transparent paper, mounted on a roll, from which strip the individual patches or pieces of paper to be combined with the opening in the envelop, are cut, but if preferred, instead of a continuous strip, separate patches or pieces may be used.

I have shown in the drawings parts of an envelop machine of well known construction, with my improvements combined therewith, sufficient to enable those skilled in the art to understand the construction and operation thereof.

Figure 2:
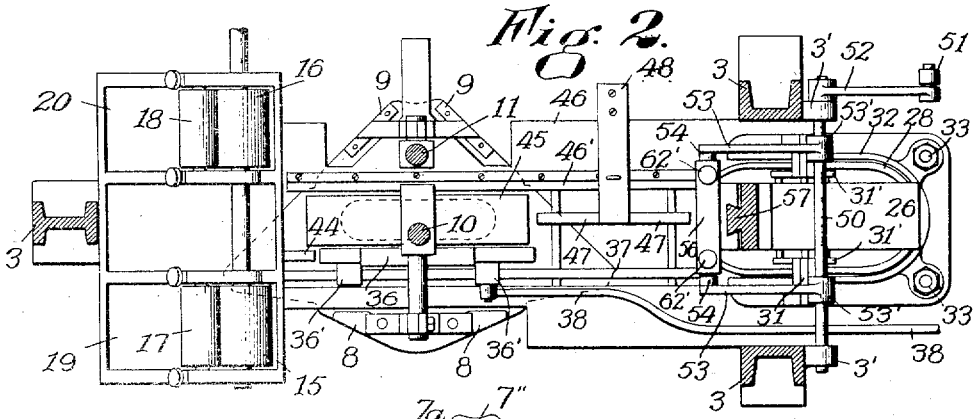
Figure 5:
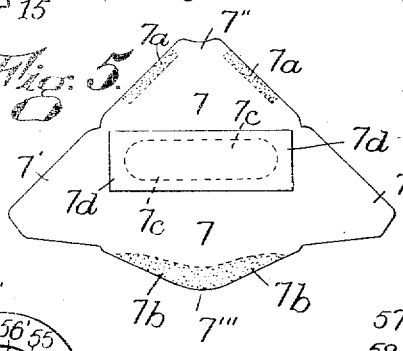
Figure 6:
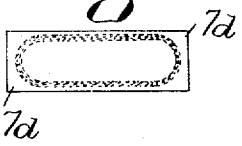
Figure 3:
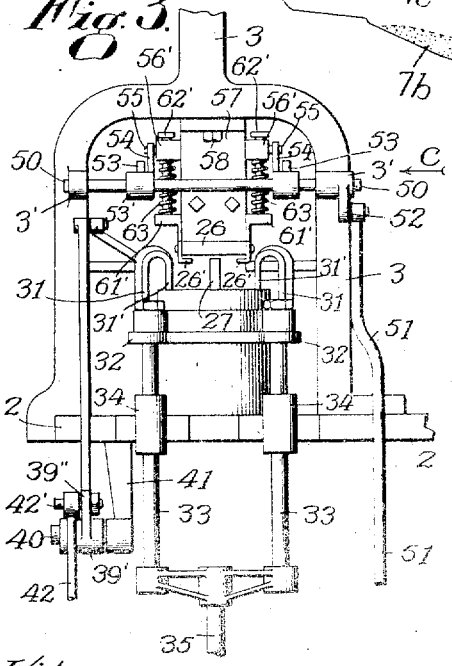
Figure 4:
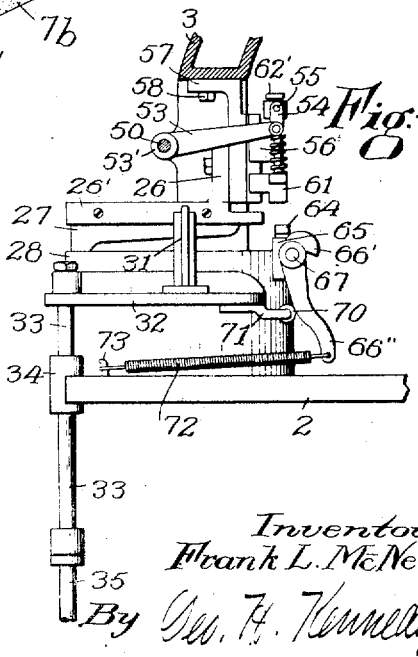
Figure 8:
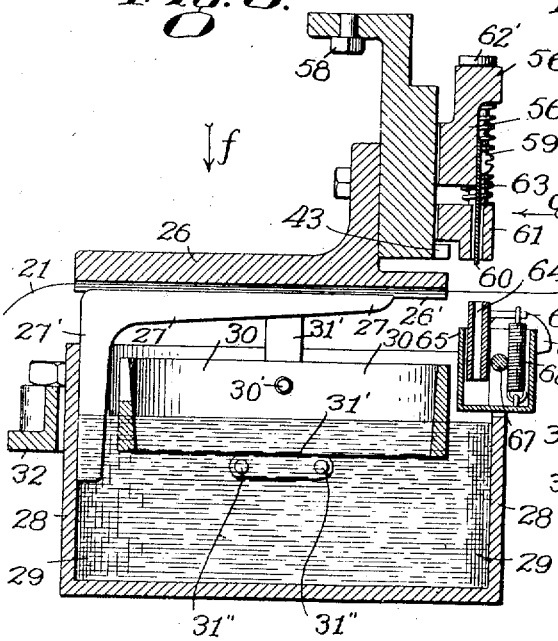
Figure 7:
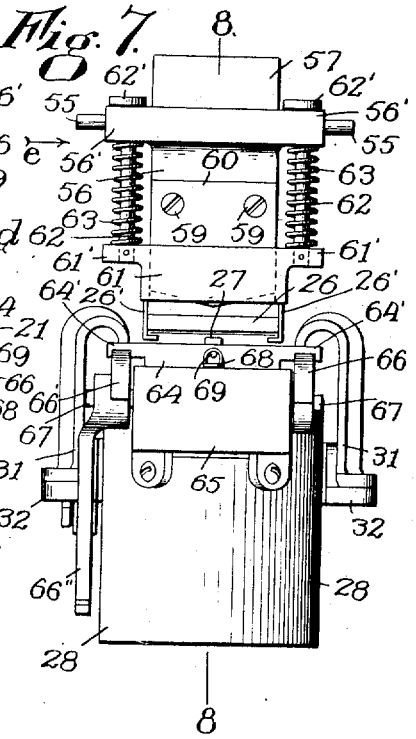
Figure 9:
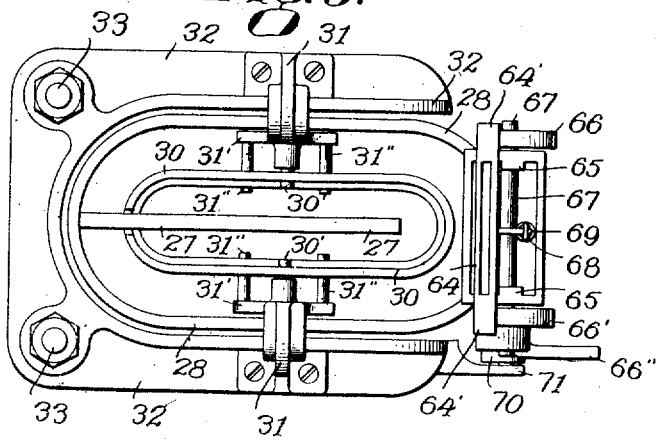

Referring to the drawings:—Figure 1 is a front view of a detached portion of an envelop machine with my improvements combined therewith. Fig. 2 is a section, on line 2, 2, Fig. 1, looking in the direction of arrow *a*, same figure. Fig. 3 is an end view of some of the parts shown in Fig. 1, looking in the direction of arrow *b*, same figure. Fig. 4 is a side view of the patch gumming and cutting mechanism, detached, looking in the direction of arrow *c*, Fig. 3. Fig. 5 is a plan view of an envelop blank having a patch of transparent paper applied thereto. Fig. 6 shows the patch of transparent paper with the gum or adhesive material thereon, before the patch is applied to the envelop blank. Fig. 7 shows, on an enlarged scale, a front view of the cutting and gumming mechanism, looking in the direction of arrow *d*, Fig. 8. Fig. 8 is a section, on line 8, 8, Fig. 7, looking in the direction of arrow *e*, same figure. Fig. 9 is a plan view of the gum receptacle, detached, looking in the direction of arrow *f*, Fig. 8. Fig. 10 corresponds to Fig. 8, but shows some of the parts shown in Fig. 8, in a different position, and when the transparent strip is being gummed and cut, and also shows the strip carrier combined therewith. Fig. 11 corresponds to Fig. 10, but shows some of the parts in their opposite positions, and the strip carrier ready to seize the transparent strip, after it has been gummed and cut; some of the parts shown in Fig. 10 are not shown in this figure, and Fig. 12 is, on an enlarged scale, a section, on line 12, 12, Fig. 10, looking in the direction of arrow *g*, same figure.

In the accompanying drawings, 1 is a portion of the lower frame or stand, 2 is the table, and 3 is the upper framework of an envelop machine; 4 is an envelop blank supporting or feeding table, provided with a rack 5, which meshes with and is driven by a pinion 6, to move upwardly the blank feeding table at predetermined times, in the usual way.

7 is a pile of envelop blanks supported upon the feeding table 4. Each of the envelop blanks 7 is of the desired shape, and in this instance of the shape shown in Fig. 5, having the two end flaps 7′, 7′, the back flap 7″ for the gum $7^a$, and the seal flap 7‴ for the gum $7^b$. There is an elongated opening $7^c$ through the envelop, as indicated by broken lines, over which the patch or piece of transparent paper $7^d$ extends, upon the inside of the envelop, and is secured by gum or adhesive material applied to said patch or piece of transparent paper prior to its being placed over said opening. The end flaps, back flap, and seal flap are creased and folded over to complete the envelop, in the usual and well known way.

Above the pile of envelop blanks are the gumming dies 8, and 9, see Fig. 2, for the seal flap, and the back flaps. The gumming die 8 is supported upon a vertically reciprocating guide rod 10, and the gumming dies 9 are supported on a vertically reciprocating guide rod 11, see Figs. 1, and 2, in the usual and well known way.

A vertical reciprocating movement is communicated to the gumming dies 8, and 9 by horizontally extending levers 12, and 13, which are pivotally mounted on a rod 14, and are operated through connector rods, (only one 12′ is shown in Fig. 1) to cams, not shown, on the machine, in the usual way.

The gum or adhesive material is applied to the gumming dies 8 and 9 when in their raised position, by means of gum rolls, not shown, which are adapted to receive a coating of gum at one end of their travel from the gumming rolls 15 and 16, see Fig. 2, rotating in contact with gum rolls 17 and 18, which rolls 15 and 16 are partially immersed in gum or adhesive material contained in the gum receptacles 19 and 20, in the usual way.

Through the engagement of the gum dies 8 and 9 with the uppermost blank 7 on the pile of blanks, said uppermost blank is raised from the pile and is seized by a gripper, not shown, and conveyed to the creasing and folding box, not shown, in the usual and well known way.

All of the above mentioned parts may be of any usual and well known construction, and do not form a part of my invention, but my improvements as herein shown are in this instance combined with said parts.

I will now describe my improvements. The transparent paper from which the patch or transparent piece $7^d$ is formed, consists in this instance of a continuous strip 21, which is held on a spool 22, which is mounted to rotate on an arm or bracket 23, see Fig. 1, which is pivotally supported on the stud 14, and may be adjusted and held in position by a set screw 23′. The strip 21 of transparent paper is in this instance carried between feed rolls 24 and 25; the upper feed roll 24 in this instance receives rotary motion from a shaft, not shown, operated from some driven part of the machine, to cause the paper to be unwound from the spool 22. After the strip 21 leaves the roll 25 it passes into and through a horizontally extending guide plate, which consists in this instance of a stand 26, see Figs. 7 and 8, having its side edges provided with guide strips 26′, which are bent inwardly at their lower ends, to guide and support the edges of the paper strip 21, see Fig. 7.

A plate 27, extending in the direction of the length of the strip 21, see Figs. 8 and 9, is adapted to hold said strip through its center and prevent it from sagging. The plate or carrier 27 has a downwardly extending portion 27′, which in this instance extends within the gum receptacle 28 and is rigidly secured thereto. The gum receptacle 28 is supported on the table 2 and contains gum or adhesive material 29, to be applied to the strip 21 of transparent paper. Extending within the gum receptacle 28, and adapted to be lowered into and raised out of the gum or adhesive material 29, in a vertical plane, by a non-pivotal motion is in this instance an elongated or oblong shaped die 30, which acts to carry on its upper edge the gum or adhesive material 29, and apply it in a narrow line or margin to the lower side of the transparent strip 21 near the edges thereof, as indicated in Fig. 6 by dotted lines. The shape of the die 30 corresponds preferably to the shape of the opening in the envelop blank, and the dimension of said die, on its gumming edge, is a little larger than the dimension of said opening. The gumming die 30 is in this instance pivotally supported on each side, intermediate its ends, by pins 30′, on the inwardly curved and downwardly extending ends 31′ on arms 31, which are secured upon a plate or frame 32, see Figs. 8 and 9. The lower ends of the downwardly extending ends 31′ of the arms 31, are in this instance made broader, as shown in Figs. 8, and 9, and have an inwardly extending pin 31″ on each end thereof, which form stops to limit the tilting motion of the die 30. The object of pivotally supporting the die 30 so that it may have a slight rocking or tilting motion independent of its vertical reciprocating motion, is to allow its upper edge, carrying the gum or adhesive material, to adapt itself to any inequality in the guide stand, or in the paper to which the gum is applied, or any unevenness in the gum or adhesive material, by reason of some foreign substance therein.

The frame or plate 32 is cut out through its central portion, as shown in Fig. 9, to receive the gum receptacle 28, and is secured in this instance on the upper ends of two vertically extending rods 33, see Fig. 3; said rods 33 are suitably guided in bearings 34 on the table or frame 2 of the machine. A connector rod 35 is in this instance attached to the lower ends of the rods 33, and is operated through a cam, not shown, to communicate, at predetermined intervals, an up and down movement to the connector 35, rods 33, frame 32, arms 31, and die 30.

When the frame 32 is raised to its highest position, shown in Fig. 10, from its lowest position, shown in Fig. 11, the gum or adhesive material on its upper edge is applied in a narrow line or margin to the underside of the transparent strip of paper 21, which is held in the guide stand 26. The conformation of said narrow line or margin of adhesive material corresponds to the shape or conformation of the opening in the envelop blank. After the gum is applied to the transparent strip of paper 21, said strip is carried forward, in this instance by a carrier 36, which has a reciprocating motion on a horizontally extending square rod 37, see Fig. 12, said carrier 36 having in this instance two side extensions 36′, see Fig. 1, through which said rod 37 extends. A rod 38 has one end pivotally connected to a stud 36″ on the carrier 36, see Fig. 1, and its other end pivotally connected to the upper end of an arm or lever 39, having its hub 39′ pivotally mounted on a stud 40, carried on a hanger or bracket 41. Extending out from the hub 39′ is a second arm 39″, which has an elongated slot 39‴ therein, in which is adjustably attached, by a bolt 42′, the upper end of a connector 42, which is connected with and operated by a cam, not shown, on some driven part of the machine.

The strip carrier 36, see Figs. 10, 11, and 12, consists in this instance of a bar 36‴, which loosely slides in the frame 36, and is loosely secured thereon through the center block $36^a$. The bar 36‴ has a downwardly extending projection $36^b$ on each end thereof, which projections are adapted to engage and travel upon cam shaped extensions $36^c$ on spring blades $36^d$, which in this instance are suitably secured to the center block $36^a$, see Figs. 10 and 11. The lower sides of the spring blades $36^d$ have secured thereon projections $36^e$, adapted to engage and grip the strip 21, which enters through the open end of the carrier 36. When the strip carrier 36 travels toward the gumming mechanism, preparatory to occupying the position shown in Fig. 11, the end of the bar 36‴ will engage a stop 43, to move the bar 36‴, from the position shown in Fig. 10 to the position shown in Fig. 11, and causes the projections $36^b$ on said bar, to travel up on the projections $36^c$ on the springs $36^d$, to depress said springs, and cause the projection $36^e$ at the right in Fig. 11, to grip the patch or piece of transparent material already cut from the continuous strip by the cutting mechanism, and the projection $36^e$ at the left, Fig. 11, to grip the end of the continuous strip 21. The movement of the carrier 36 to the right, through the rod 38, to the position shown in Fig. 10, will cause the patch or piece already cut to be carried over the pile of blanks 7, preparatory to being attached to the upper blank, and the continuous strip 21 to be drawn along, preparatory to being cut off by the cutting mechanism. On the movement of the carrier 36 to the right, the engagement of the projecting end of the bar 36‴ with the stop 44, see Fig. 10, will move said bar 36‴ to the left, and disconnect the projections $36^b$ thereon from the projections $36^e$ on the springs $36^d$, and allow said springs to return to their normal position and release the cut off patch, and the continuous strip. The cutting mechanism is operated to cut off another patch from the strip, and the carrier is returned to its position to the left, as shown in Fig. 11, and this operation is repeated.

A plunger 45 having its under surface substantially in the same plane as the gummed under surfaces of the gumming dies 8 and 9 is attached, in the present instance, to the vertically reciprocating rod 10 which carries the gumming die 8 for gumming the seal flaps of the envelop blanks. The plunger 45 consists of a plate of sufficient size to cover substantially the transparent patch and it is moved in a fixed path in registration with the openings in the envelop blanks as the latter are supported on the feeding table 4. When a patch has been moved into proper position beneath the plunger 45, the latter descends and presses the patch upon the uppermost blank in the pile 7, said plunger 45 and feeding table constituting the two pressing members by which the patch is securely attached to the envelop blank to cover the opening therein. As the blanks are successively removed from the pile 7 by their adhesion to flap gumming dies 8 and 9, the feeding table is moved upward by the rotation of the pinion 6 in engagement with the rack 5 of the feeding table 4, thereby maintaining the uppermost blank in a plane to receive the pressure of the plunger 45.

A plate 46 is supported on the table 2 and is provided with a longitudinally extending bar 46′, preferably undercut as shown in Fig. 12, which bar extends parallel with the carrier supporting rod 37, and acts to guide the edge of the cut off patch and also the strip 21. When the continuous strip 21 has been drawn forward by the strip carrier 36, as shown in Fig. 10, it is engaged by a bar 47, which acts to retain or hold the strip 21 in position. The bar 47 is in this instance supported on the end of a spring blade 48, which is rigidly attached at its other end to the frame of the machine, or some other stationary part. A flexible connection 49 is attached at one end to the spring blade 48, and at its other end in this instance to the operating lever 13, which as it operates, acts to positively raise the holding bar 47, to release the strip, and to lower the holding bar 47, and allow its spring blade 48 to act to press the bar against the strip 21 during the operation of the cutting mechanism, which will be hereinafter described.

I will now describe the cutting mechanism for the strip of transparent paper. A rock shaft 50, see Fig. 4, is mounted in bearings 3′ on the frame 3, and receives a rocking motion at predetermined times, from some driven part, not shown, on the machine, through a connector 51, pivotally attached at its upper end to a lever 52 fast on the shaft 50. On the rock shaft 50 are secured the hubs 53′ of two levers 53, which extend inwardly from said shaft. The end of each lever 53 is connected, through a link 54, with a stud or pin 55 on the vertically moving knife bar 56, which is adapted to slide up and down on the stand 57, which is secured at its upper part by a bolt 58 to the frame 3, and extends downwardly therefrom. The knife bar 56, see Fig. 8, has fastened thereon, in this instance by screws 59, a cutter knife or blade 60, which in this instance extends within a slot in a guide block 61. The guide block 61 has extending out therefrom two ears 61′, having openings therethrough, in which are secured the lower ends of small rods or pins 62, the upper ends of said rods or pins extend loosely through openings in the side extensions 56′ on the knife bar 56, and have enlarged ends 62′ thereon. A helically coiled expansion spring 63 encircles each rod 62, and bears at one end against the lug 61′ on the guide and presser block 61, and at its other end against the lug 56′ on the knife bar 56, to yieldingly hold the guide and presser block 61, away from the knife bar 56. The second member of the cutting mechanism consists in this instance of the lower presser block 64, which is suitably guided in a vertical plane in a guide stand 65, secured in this instance upon the front side of the gum receptacle 28. The block 64 has outwardly extending projections 64′ thereon, which are adapted to rest upon two cams 66 and 66′, secured on a transverse shaft 67. A helically coiled contraction spring 68, attached at one end to a pin 69 on the lower block 64, and at its other end to the stand 65, see Fig. 8, acts to yieldingly hold down the block 64. The cam 66′, see Figs. 4, 7, and 9, has an arm 66″ extending downwardly therefrom and preferably of curved shape, as shown in Fig. 4, said arm 66″ being adapted to be engaged by a roll 70, see Fig. 4, which roll is carried on an arm 71 attached to the frame 32. A helically coiled contraction spring 72, secured at one end to the arm 66″, and at its other end to a stud 73 on the bed 2, acts to yieldingly hold the arm 66″ in engagement with the roll 70.

On the upward movement of the frame 32 and the gum die 30, to apply gum to the transparent paper strip 21, the roll 70 will travel upwardly on the downwardly extending arm 66″, and will rock the shaft 67 and the cams 66 and 66′ fast thereon, and cause the block 64 to be raised until it engages the lower surface of the paper strip 21. At the same time the upper knife bar 56, through its actuating mechanism, is moved downwardly, carrying the knife blade 60 secured thereto, and at the same time the actuating springs 63 cause the downward movement of the guide and presser block 61, until the lower edge of said block engages the upper side of the strip of paper 21, and with the other block 64, acts to hold the strip of paper. The continued movement of the knife bar 56 with the knife blade 60, causes the paper strip 21 to be severed by said knife blade, which in this instance enters a vertical opening or recess in the lower presser block 64, see Fig. 10. The cutting blade or knife 60 has its lower cutting edge preferably of the shape shown in Fig. 7, which is of wedge shape, having a point at its central portion, with its cutting edge inclined from said point to each edge.

In the continued operation of the cutting mechanism, when the cutting blade and other parts are returning to their inoperative position, as shown in Fig. 11, the strip carrier 36 is operated to grip the end of the continuous strip 21, and also the severed piece, $7^a$, to carry them forward toward the envelop blank, as hereinbefore described.

The operation of my improvements in connection with the drawings will be readily understood by those skilled in the art, and briefly is as follows:—A roll of transparent paper of a width sufficient to cover the opening in the envelop blank and to extend by the edges of said opening, is placed upon the spool roll 22, and the end of the strip drawn between the rolls 24 and 25, and through the guide plate 26 and under the cutting mechanism, until its end is engaged by the grippers on the carriage 36. The machine is then put into operation, and the gumming die 30 will be raised out of the gum receptacle 28 to apply the gum, carried on the upper edge of said die, to the lower side of the strip 21. The carriage 36 is then operated to draw the gummed part of the strip under the cutting mechanism for a predetermined length of the strip, according to the length of the opening in the envelop blank. The knife blade 60 then descends to sever the strip 21 and during the operation of cutting the bar 47 is permitted to descend and pressing upon the strip 21 hold the severed piece in its intermediate position, between the gumming die 30 and the patch applying plunger 45. The return movement of the carriage 36 causes the advanced end of the severed patch and also the advanced end of the continuous strip 21 to be simultaneously seized by the two gripping jaws 36$^e$, 36$^e$. The upward movement of the operating lever 13 then raises the bar 47 to release the severed piece for the next movement of the carriage 36, allowing the severed piece to be moved beneath the plunger 45 and in position over the opening in the topmost blank in the pile 7. In the continued operation of the machine, the gumming die, which has been lowered into the gum receptacle, is again raised to apply gum to the underside of the strip, and the cutting mechanism is operated to sever or cut the strip, and the carriage moves along the severed piece to carry it over the envelop blank, and at the same time draws forward the projecting end of the strip which has been gummed, preparatory to said gummed part being severed by the cutting mechanism and carried forward over the envelop blank. After the piece of transparent paper or patch is carried over the envelop blank, the plunger 45 descends and carries the patch or piece of transparent paper down onto the envelop blank, and presses it thereon to attach it to said blank, and this operation is repeated, the feed table having, during the operation of the machine, an upward movement as is common in envelop machines of this type.

In my improvements, as shown and described herein, the patches or pieces of transparent paper to be applied to the envelop blanks to cover the opening therein are in the form of a continuous strip, which strip is first gummed by the gumming mechanism, and is then drawn under the cutting mechanism to be cut, and then the cut piece is carried over the envelop blank. Instead of having a continuous strip of transparent paper from which the patches or pieces of paper are cut in the operation of the machine, I may provide pieces or patches already cut in the desired length, which are fed by any well known mechanism to the gumming mechanism and are then carried to the envelop blank to which they are to be attached.

It will be understood that the details of construction of my improvements may be varied if desired.

Having thus described my invention, what I claim as new and desire to secure by Letters Patent is:

1. An organized automatic machine for manufacturing envelops having an opening therethrough and a transparent covering for said opening inside of the envelop, comprising means for applying adhesive material to a transparent patch, adjoining the edge thereof, means for carrying said patch, having adhesive material thereon, to an envelop blank having an opening therethrough, and means for pressing said patch on to said envelop blank to cover said opening, said last mentioned means operating substantially simultaneously with the gumming of the flaps of the envelop, and the raising of the envelop blank to be carried to the creasing and folding box, to be creased and folded.

2. An organized automatic machine for manufacturing envelops having an opening therethrough and a transparent covering for said opening inside of the envelop, comprising means for applying adhesive material to a strip of transparent paper, the conformation of said adhesive material corresponding subtantially to the shape or conformation of the opening in the envelop, means for severing said strip, after the adhesive material has been applied thereto, means for carrying said severed piece, having the adhesive material thereon, to an envelop blank having an opening therethrough, and means for pressing said piece on the envelop blank to cover said opening, said last mentioned means operating substantially simultaneously with the gumming of the flaps of the envelop blank, and the raising of the envelop blank to be carried to the creasing and folding box, to be creased and folded.

3. In mechanism for attaching patches to envelop blanks having openings therein, gumming mechanism for applying gum in a narrow line or margin to the strip from which the patches are cut, comprising a gum receptacle, a gumming die adapted to be moved into said receptacle to receive the gum on its engaging edge, and to be raised out of said receptacle to apply the gum in a narrow line or margin to said strip, said gumming die being pivotally mounted to have a rocking or pivotal movement, in addition to, and independent of its raising and lowering movement.

4. In mechanism for attaching patches to envelop blanks having openings therein, gumming mechanism for applying gum in a narrow line or margin to the strip from which the patches are cut, comprising a gum receptacle, a gumming die adapted to be moved into said receptacle, to receive the gum on its engaging edge, and to be raised out of said receptacle to apply the gum in a narrow line or margin onto said strip, said gumming die being pivotally mounted to have a rocking or pivotal movement, and stops for limiting the pivotal movement of said die.

5. In mechanism for attaching patches to envelop blanks having openings therein, mechanism for applying adhesive material in a narrow line or margin to a patch, mechanism for gripping and moving said patch from the gumming mechanism, and for simultaneously carrying a second patch with the adhesive material thereon to an envelop blank, having an opening therein, and mechanism for applying to an envelop blank said patch, to cover said opening.

6. In mechanism for attaching patches to envelop blanks having openings therein, mechanism for applying adhesive material to a patch, mechanism for gripping and moving a patch from the gumming mechanism, and for simultaneously carrying a second patch to the envelop blanks, and mechanism for holding a patch in its intermediate position, while the gripping mechanism is returning to the gumming mechanism.

7. In mechanism for attaching patches to envelop blanks having openings therein, mechanism for applying adhesive material to a strip of transparent paper, mechanism for severing said strip, mechanism for gripping and moving the strip of paper from the gumming mechanism, preparatory to its being severed, and also carrying a severed and gummed patch to the envelop blanks.

8. In mechanism for attaching patches to envelop blanks having openings therein, mechanism for applying adhesive material to a strip of transparent paper, mechanism for severing said strip, mechanism for gripping and moving the strip of paper from the gumming mechanism, preparatory to its being severed, and also carrying a severed and gummed patch to the envelop blanks, and mechanism for holding the severed patch in its intermediate position, while the gripping mechanism is returning to the gumming mechanism.

9. In mechanism for attaching patches to envelop blanks having openings therein, mechanism for gumming a patch, mechanism for gripping the gummed patch, mechanism for carrying the gummed patch from the gumming mechanism, and mechanism for simultaneously carrying a second gummed patch to an envelop blank having an opening therein.

10. In mechanism for attaching patches to envelop blanks having openings therein, mechanism for gumming a strip of transparent paper, mechanism for gripping said strip, mechanism for drawing it from the gumming mechanism, mechanism for cutting said strip, and mechanism for carrying the gummed patch cut from said strip to an envelop blank having an opening therein.

11. In an envelop machine, a feeding table for supporting a pile of envelop blanks having openings therein, a reciprocating die for applying gum to the uppermost blank and raising it by adhesion from the pile of blanks, a vertically reciprocating plunger in registration with the openings in the blanks, means for applying gum to a transparent patch to cover the opening in the blank, means for moving the gummed patch beneath said plunger, and means for imparting an upward movement to said feeding table as the blanks are successively raised therefrom by the gumming die.

12. In an envelop machine, a feeding table for supporting a pile of envelop blanks having openings therein, gumming dies for applying adhesive material to the flaps of the uppermost blank in the pile, a vertically reciprocating plunger in registration with the opening in the blanks, means for moving a transparent patch provided with adhesive material beneath said plunger, and means for imparting an upward movement to said feeding table.

13. In an envelop machine, a feeding table for supporting a pile of blanks having openings therein, a vertically reciprocating die for applying adhesive material to the flap of the uppermost blank, a plunger in registration with the openings in the blank, as they are held on said feeding table, and having its under surface substantially in the plane of the gummed under surface of said gumming die, means for imparting a vertically reciprocating movement to said plunger, means for applying adhesive material to a transparent patch, means for moving the patch beneath said plunger, and means for imparting an upward movement to said feeding table as the blanks are successively removed therefrom.

14. In an envelop machine, means for supporting a blank having an opening therein, a plunger in registration with the opening in the blank, a coil of transparent paper, means for drawing a continuous strip from said coil, means for applying adhesive material to said strip, means for severing a piece from said strip to form a patch with said adhesive thereon to cover the opening in the blank, means for holding said severed patch intermediate said gumming means and said plunger, means for moving the severed patch beneath the plunger, and means for vertically reciprocating the plunger to press the gummed patch upon the blank.

15. In an envelop machine, a feeding table for supprting a pile of envelop blanks, a plunger coöperating with said feeding table to press a patch upon the uppermost blank in the pile of blanks, means for moving a patch between the uppermost blank and said plunger, means for imparting a vertically reciprocating movement to said plunger, and means for raising the uppermost blank vertically from the pile of blanks.

16. In an envelop machine, a feeding table for supporting a pile of envelop blanks having openings therein in an extended position, a plunger coöperating with said feeding table as a pressing member, means for feeding a patch to said plunger in registration with the opening in the blank, means for imparting a vertically reciprocating motion to said plunger, and means for raising the topmost blank vertically from the pile of blanks.

17. In an envelop machine, a feeding table for supporting a pile of envelop blanks, having openings therein, a vertically reciprocating plunger coöperating with said feeding table to press a patch upon the uppermost blank in the pile of blanks, means for moving said feeding table upwardly to maintain the uppermost blank in substantially the same plane, means for supporting a coil of transparent paper, means for removing a continuous strip from said coil, means for severing a patch from said strip, means for moving said patch beneath said plunger.

18. The combination with a support for an envelop blank having an opening therein and a reciprocating gumming die for applying gum to the blank while held on said support and for subsequently raising the blank from its support by its adhesion to said die, of means for holding a patch above and in registration with the opening in the blank, while held on said support, means for lowering said patch to carry it into contact with the blank, and means for applying gum between the opposing surfaces of the patch and blank to secure the adhesion of the patch to the blank.

19. The combination with supporting means for a blank having an opening therein, a flap gumming die for applying gum to the flap of the blank while held on said supporting means, means for supporting a patch above and in registration with the opening in the blank, and means coöperating with the blank supporting means for applying pressure to the patch and blank while the flap gumming die is in contact with the blank.

20. In an envelop machine, supporting means for an envelop blank having an opening therein, means for supporting a patch above and in registration with the opening in the blank, means for lowering the patch, said lowering means coöperating with the blank supporting means to apply pressure to the patch and blank, means for raising the blank supporting means, and means for raising the patched blank vertically from its support.

Dated this sixteenth day of July, 1915.

FRANK L. McNEILL.

Witnesses:

RUFUS B. FOWLER,

PENELOPE COMBERBACH.